United States Patent
Coney et al.

(10) Patent No.: US 7,819,578 B2
(45) Date of Patent: Oct. 26, 2010

(54) FLUID TEMPERATURE MEASUREMENT DEVICE

(75) Inventors: Michael H. Coney, Derby (GB); Andrew J. Mullender, Nottingham (GB); Hugh M. L. Watson, Derby (GB); Christopher S. Boniface, Derby (GB)

(73) Assignee: Rolls-Royce PLC, London (GB)

( * ) Notice: Subject to any disclaimer, the term of this patent is extended or adjusted under 35 U.S.C. 154(b) by 322 days.

(21) Appl. No.: 11/979,324

(22) Filed: Nov. 1, 2007

(65) Prior Publication Data
US 2008/0130708 A1   Jun. 5, 2008

(30) Foreign Application Priority Data
Dec. 1, 2006   (GB) .................. 0624002.2

(51) Int. Cl.
G01K 1/16 (2006.01)
G01K 1/20 (2006.01)
G01K 1/14 (2006.01)
G01K 11/00 (2006.01)
G01K 13/02 (2006.01)

(52) U.S. Cl. ............ 374/141; 374/208; 374/144; 374/160; 374/161; 374/147

(58) Field of Classification Search ........... 374/141, 374/144, E1.001, 43–45, 29, 137, 39–40, 374/147, 148, 153, 160–163, 152, 166, 167, 374/112, 183, 185, 57, 208
See application file for complete search history.

(56) References Cited

U.S. PATENT DOCUMENTS

| | | | |
|---|---|---|---|
| 1,372,554 A * | 3/1921 | Sahlin | 116/216 |
| 1,515,222 A * | 11/1924 | Ruben | 374/146 |
| 2,552,017 A * | 5/1951 | Schwartz et al. | 73/204.15 |
| 3,059,474 A * | 10/1962 | Keiler et al. | 374/106 |
| 4,019,368 A | 4/1977 | Navato | |
| 4,121,763 A * | 10/1978 | Roberge | 236/87 |
| 4,241,868 A * | 12/1980 | Perkins | 236/12.11 |
| 4,397,176 A * | 8/1983 | Rohde et al. | 73/35.07 |
| 4,418,329 A * | 11/1983 | Gruner | 338/28 |
| 4,423,967 A * | 1/1984 | Mouton | 374/138 |
| 4,586,829 A * | 5/1986 | Hubner et al. | 374/144 |
| 4,630,028 A * | 12/1986 | Kelly et al. | 340/449 |
| 4,978,230 A * | 12/1990 | Adiutori et al. | 374/43 |
| 4,994,792 A * | 2/1991 | Ziegler, Jr. | 340/584 |
| 5,060,511 A * | 10/1991 | Sakaue et al. | 73/204.26 |
| 5,265,959 A | 11/1993 | Meltzer | |
| 5,380,092 A * | 1/1995 | Alain | 374/160 |
| 5,660,473 A * | 8/1997 | Noma et al. | 374/145 |
| 5,806,528 A | 9/1998 | Magliochetti | |
| 5,879,082 A * | 3/1999 | Smitherman et al. | 374/110 |

(Continued)

FOREIGN PATENT DOCUMENTS

EP   1 281 946 A1   2/2003

(Continued)

Primary Examiner—Gail Verbitsky
(74) Attorney, Agent, or Firm—Oliff & Berridge, PLC

(57) ABSTRACT

A temperature measuring arrangement measures the temperature of a fluid passing a component. The arrangement includes a temperature measuring device having a substrate of low thermal capacity that has applied thereto two or more temperature recording media. The device is attached to and spaced apart from the component and is in the fluid flow.

12 Claims, 2 Drawing Sheets

U.S. PATENT DOCUMENTS

| | | | | |
|---|---|---|---|---|
| 5,936,157 | A * | 8/1999 | Yamashita et al. | 73/204.26 |
| 6,023,969 | A * | 2/2000 | Feller | 73/204.25 |
| 6,286,995 | B1 * | 9/2001 | Takahashi et al. | 374/148 |
| 6,321,531 | B1 * | 11/2001 | Caren et al. | 60/275 |
| 6,432,287 | B1 * | 8/2002 | McMackin et al. | 204/424 |
| 6,725,716 | B1 * | 4/2004 | Kawai et al. | 73/204.26 |
| 6,782,744 | B1 * | 8/2004 | Tashiro et al. | 73/204.22 |
| 6,804,622 | B2 * | 10/2004 | Bunker et al. | 702/134 |
| 6,974,249 | B1 * | 12/2005 | Fair et al. | 374/102 |
| 7,004,622 | B2 * | 2/2006 | Hardwicke et al. | 374/141 |
| 7,063,041 | B2 * | 6/2006 | Odashiro | 116/217 |
| 7,582,359 | B2 * | 9/2009 | Sabol et al. | 428/469 |
| 2003/0039299 | A1 * | 2/2003 | Horovitz et al. | 374/141 |
| 2003/0056584 | A1 * | 3/2003 | Park | 73/204.11 |
| 2004/0216532 | A1 * | 11/2004 | Koudal et al. | 73/861.22 |
| 2005/0002439 | A1 * | 1/2005 | Blichmann | 374/147 |
| 2006/0011124 | A1 | 1/2006 | Odashiro | |
| 2006/0227850 | A1 * | 10/2006 | Johnson | 374/208 |
| 2007/0089402 | A1 * | 4/2007 | Bruck | 60/285 |
| 2008/0101434 | A1 * | 5/2008 | Horovitz et al. | 374/29 |
| 2009/0064663 | A1 * | 3/2009 | Ma et al. | 60/277 |
| 2009/0288481 | A1 * | 11/2009 | Urssens et al. | 73/204.27 |

FOREIGN PATENT DOCUMENTS

| | | |
|---|---|---|
| GB | 2 092 744 A | 8/1982 |
| GB | 2 327 755 A | 2/1999 |
| GB | 2 387 951 A | 10/2003 |
| GB | 2 401 710 A | 11/2004 |
| JP | 60166815 A * | 8/1985 |

* cited by examiner

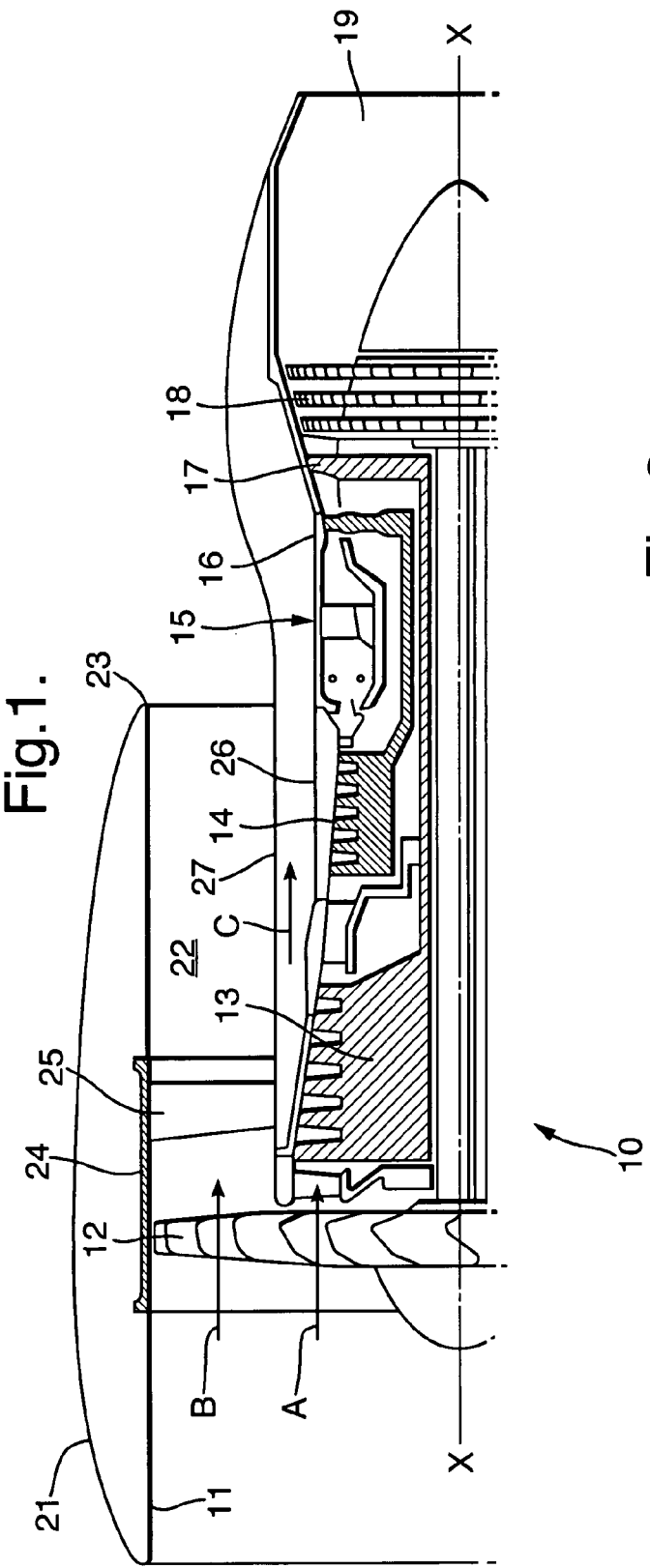
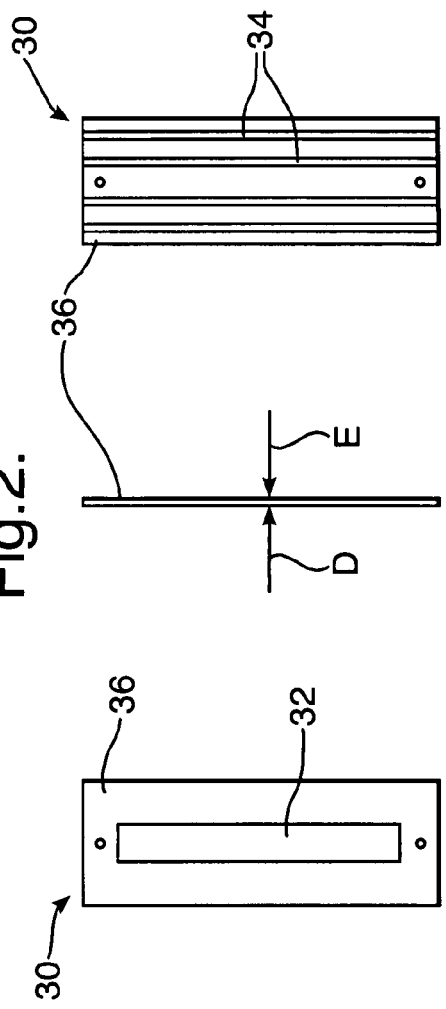

FLUID TEMPERATURE MEASUREMENT DEVICE

BACKGROUND

The present invention relates to a temperature measurement device for measuring the temperature of air, particularly but not exclusively, in a conduit in a gas turbine engine.

There are many known devices for measuring a component's temperature, for example thermocouples, thin film gauges, hot wires and thermopiles and each may be calibrated to give an indication of a fluid's temperature when applied to a wall of the fluid conduit. However, all these prior art devices suffer from installation and signal conditioning shortfalls in addition to robustness limits especially if used in a gas turbine engine environment. A further problem is that these devices measure the temperature of the component rather than the temperature of the direct temperature of the fluid. Although the component's temperature is indicative of the fluid's temperature during steady state conditions, the thermal inertia of the component means that rapid changes of the fluid's temperature will not be measured. In addition to these disadvantages, the expense is also a major consideration. As a result incomplete temperature measurement of a conduit or system is the common. Furthermore, system calibration, signal conditioning and physically routing the measurement data is also time consuming and therefore expensive.

SUMMARY

Therefore it is an object of the present invention to provide an air temperature measuring device that overcomes the above mentioned problems.

In accordance with the present invention a fluid flow temperature measuring device for a fluid passing a component, characterised in that the device comprises a substrate, of lower thermal capacity than the component, having applied thereto a temperature recording media, the device is attached to and spaced apart from the component and is in the fluid flow.

Preferably, two different temperature recording media are applied to the substrate.

Preferably, the temperature recording media is any one of the group comprising a wax based thermal tab and a thermal paint.

Preferably, the temperature recording media are placed on different sides of the substrate.

Preferably, the substrate has a lower thermal capacity than the component.

Preferably, the substrate is 0.25 mm in thickness, but may be less than 2 mm in thickness.

Normally, the substrate is metallic.

Preferably, a radiation shield is positioned between the substrate and the component.

Preferably, at least one temperature measuring device is attached to the radiation shield.

Alternatively, the radiation shield is a low emissivity coating applied to the component.

Alternatively, the radiation shield is a low emissivity coating applied to one side of the shim.

BRIEF DESCRIPTION OF THE DRAWINGS

The present invention will be more fully described by way of example with reference to the accompanying drawings in which:

FIG. 1 is a schematic section of part of a ducted fan gas turbine engine;

FIG. 2 comprises edge and side views on surfaces A and B of a substrate, each having a temperature recording media applied thereto and is in accordance with the present invention;

DETAILED DESCRIPTION OF EMBODIMENTS

Figure 3:
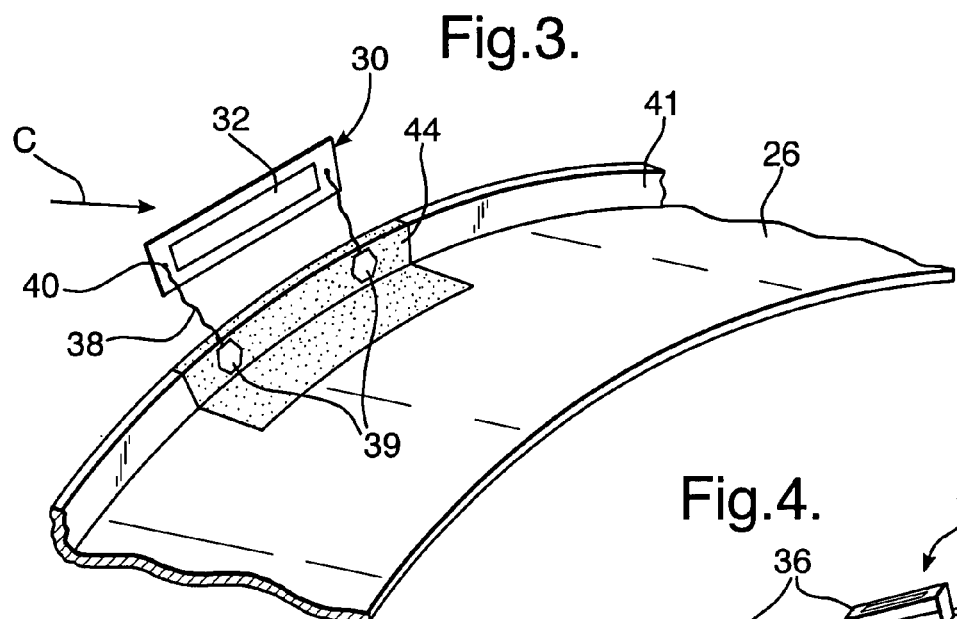
FIG. 3 is a schematic perspective view of a temperature measuring arrangement in accordance with the present invention.

Referring to FIG. 1, a ducted fan gas turbine engine generally indicated at 10 has a principal and rotational axis X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core exhaust nozzle 19. A nacelle 21 generally surrounds the engine 10 and defines the intake 11, a bypass duct 22 and an exhaust nozzle 23.

The gas turbine engine 10 works in the conventional manner so that air entering the intake 11 is accelerated by the fan 12 to produce two air flows: a first airflow A into the intermediate pressure compressor 13 and a second airflow B which passes through a bypass duct 22 to provide propulsive thrust. The intermediate pressure compressor 13 compresses the airflow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The fan 12 is circumferentially surrounded by a structural member in the form of a fan casing 24, which is supported by an annular array of outlet guide vanes 25.

The core of the engine comprises the compressors 13, 14, combustor 15 and turbines 16, 17, 18 and is surrounded by an inner casing 26 and outer casing 27, which define a space therebetween. Various engine accessories are housed between the inner and outer casings 26, 27 and there is a requirement to ventilate this space, otherwise known as a fire zone. Ventilation air is ducted through the fire zone by conventional means not shown, but produces a flow of air generally passing in the direction of arrow C. The ventilation air also provides cooling to the engine casings and accessories.

An example application of the present invention is monitoring the temperature of the ventilation air flowing through the fire zone so that suitable quantities can be provided and directed therearound. In experimental engines, for example, the required minimum amount of air can be set so that fixed ducting can be designed to provide minimum amounts of air.

Current techniques apply the temperature measuring device to the casings 26, 27 and as such do not directly measure air temperature. Thus the devices and the surrounding environment require calibration, but are still inadequate to monitor rapid changes in air temperature due to the high thermal inertia of the casing. Furthermore, temperature changes to the opposite side of the casings can adversely affect the device reading.

Referring now to FIGS. 2 and 3, a temperature measuring device 30, in accordance with the present invention, comprises recording media 32, 34 applied to a substrate of very low thermal capacity. In this case a thin stainless steel shim 36 is used. This arrangement ensures very fast temperature change and therefore is capable of recording the temperature of a fluid, particularly gases. A preferred embodiment employs, on one side of the shim 36, a wax based thermal tab 32a-32g and on the other side, an array of thermal paints 34a-34e.

The thermal tab 32 comprises an array of wax elements 32a-32g each of which has an indicative melt point. In this example, the melt points are 40, 70, 100, 130, 160, 200, 225, 260° C. The thermal paints 34a-34e have colour change points of 120, 165, 210, 270 and 350° C. and broadly cover the temperature range of the thermal tab 32. The thermal paints 34a-34e act as a cross check to ensure the thermal tab 32 is operating correctly as contamination from oil, for example, is a known occurrence.

It should be appreciated that the thermal tab 32 and thermal paint 34 may be placed on the same side of the shim 36.

Furthermore, it should be appreciated that the temperature measuring device 30 of the present invention is an independent device not connected by wires such as with a thermocouple. However, other independent recording media may be substituted for either the thermal tab 32 or the stripes of thermal paint 34. The substrate or shim has a very low thermal capacity and is particularly thin although this depends on the material used. For a stainless steel shim a suitable thickness is 0.25 mm. For aluminium, for example, a slightly thicker shim 36 may be used, as its density and thermal inertia is less than steel. The low thermal capacity ensures that the recording media 32, 34 are almost instantly subject to changes in the thermal flux of the air flow C, rather than the shim itself or worse the component/casing.

The term 'low thermal capacity' refers to the shim 36 having a lower thermal capacity than the component 26 it is attached to. However, it is preferable for the shim's thermal capacity to be as low as possible.

The suitable plan size of the substrate or shim can be chosen to suit the required task and in this exemplary embodiment, the preferred size is approximately 75 mm×25 mm. The low weight of the device 30 allows it to be attached by wires 38 threaded through holes 40 at either end of the shim 36 to any suitable part of the engine structure, in this case bolts 39 on a flange 41 joining two casings.

An important aspect of the present invention is that the device 30 is spaced apart from the component or casing 26. Therefore conductive heat from the component is not passed into the device 30. Thus the temperature measuring arrangement does not require calibration relative to its application and more precise temperatures of the fluid C are recorded.

Figure 4:
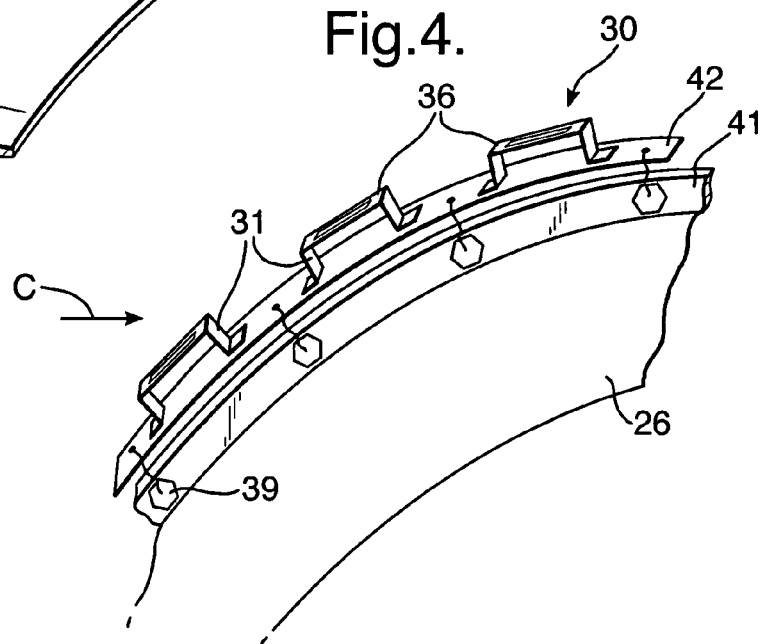
FIG. 4 is a schematic perspective view of a second embodiment of the temperature measuring arrangement in accordance with the present invention.

In FIG. 4, a series of temperature measuring devices 30 are attached to a radiation shield 42, such that the radiation shield is between the device and the hot casing 24, 31. The shim portion 36 is held away from the shield 42 by legs 31 extending from the shim 36 to the shield 42. This radiation shield 42 may be formed from a variety of shapes to fit the particular application. In this example air temperature readings are required around the circumference of the casing 26 so the shield 42 is an annular strip, however, it may also be made from segments joined together to surround the casing 26.

Alternative techniques to shield the temperature measuring devices 30 from radiation could also be used, for example, a low emissivity coating 44 may be applied to the flange and casing adjacent the temperature measuring device 30 (see FIG. 3). The emissivity coating 44 is defined as low relative to the component 26 itself, however, the skilled person would appreciate that the coating should have as low an emissivity as practicable.

Figure 5:
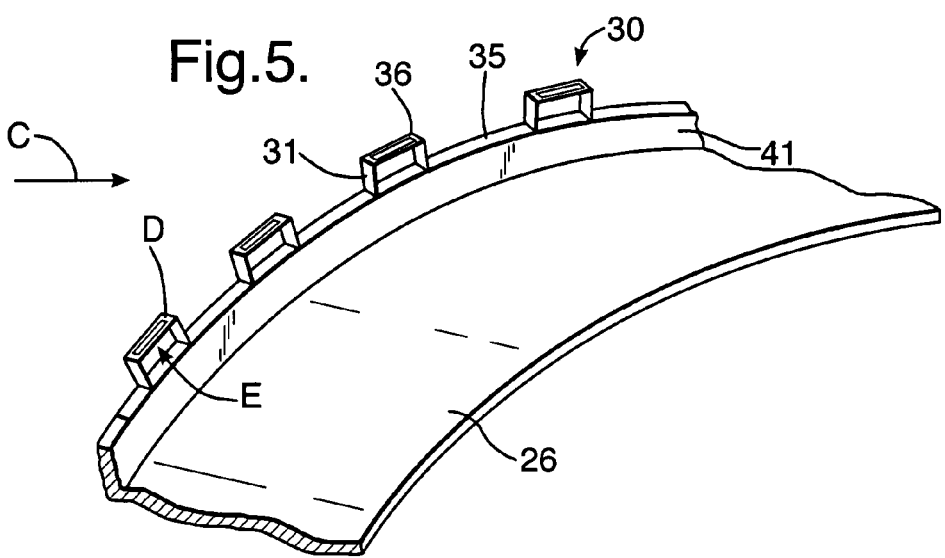
FIG. 5 is a schematic perspective view of a third embodiment of the temperature measuring arrangement in accordance with the present invention.

In FIG. 5, the temperature measuring device 30 comprises zigzags of shims 36 and portions 35 connected by legs 35. The portions 35 are in contact with the casing and may be temporarily attached via spot welding or adhesive for example or may be annular and held in place by an interference fit. The thermal tab 32 and paints 34 are on opposing sides D and E, however, thermal indicating media 32, 34 may be placed on side D and a low emissivity coating 44 may be applied to side E facing the casing.

The temperature measuring device 30 is particularly suitable for finding leaks within the fire zone as these leaks may only be apparent at transient conditions and therefore short time periods. Thermal recording media applied to the casing itself would not be suitable for detecting these types of temperature fluxes.

It should be appreciated that the temperature measuring device 30 according to the present invention is not restricted to application in a gas turbine engine and the skilled person would readily appreciate other applications where monitoring the temperature of any fluid is required.

The advantages of the temperature measuring device 30 are: low cost, ease of installation obviating the need for expensive routing and readout equipment and high integrity due to the use of established temperature indicating techniques.

We claim:

1. A fluid flow temperature measuring device for a fluid passing a component of a gas turbine engine, the device comprising:
   a shim, of lower thermal capacity than the component; and
   a temperature recording media applied to the shim, the device being attached to and spaced apart from the component and being in a flow of the fluid,
   wherein the component is a portion of the gas turbine engine.

2. A fluid flow temperature measuring device as claimed in claim 1 wherein two different temperature recording media are applied to the shim.

3. A fluid flow temperature measuring device as claimed in claim 1 wherein the temperature recording media is any one of the group comprising a wax based thermal tab and a thermal paint.

4. A fluid flow temperature measuring device as claimed in claim 1 wherein the temperature recording media are placed on different sides of the shim.

5. A fluid flow temperature measuring arrangement as claimed in claim 1 wherein the shim is less than 2 mm in thickness.

6. A fluid flow temperature measuring device as claimed in claim 1 wherein the shim is 0.25 mm in thickness.

7. A fluid flow temperature measuring device as claimed in claim 1 wherein the shim is metallic.

8. A fluid flow temperature measuring device as claimed in claim 1 wherein a radiation shield is positioned between the shim and the component.

9. A fluid flow temperature measuring device as claimed in claim 8 wherein at least one temperature measuring device is attached to the radiation shield.

10. A fluid flow temperature measuring device as claimed in claim 8 wherein the radiation shield is a low emissivity coating applied to the component.

11. A fluid flow temperature measuring device as claimed in claim 8 wherein the radiation shield is a low emissivity coating applied to one side of the shim.

12. A fluid flow temperature measuring device as claimed in claim 1, the shim being configured such that the lower thermal capacity of the shim than the component enables rapid temperature changes to be recorded.

* * * * *